United States Patent
Salter et al.

(10) Patent No.: US 11,362,454 B2
(45) Date of Patent: Jun. 14, 2022

(54) EXTERIOR JUMP-START BATTERY TERMINAL APPARATUS

(71) Applicant: Ford Global Technologies, LLC, Dearborn, MI (US)

(72) Inventors: Stuart Salter, White Lake, MI (US); Zeljko Deljevic, Plymouth, MI (US); Michael John Huddy, Wyandotte, MI (US); David Brian Glickman, Southfield, MI (US); Lizardo Amador, Mexico City (MX)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 88 days.

(21) Appl. No.: 16/932,603

(22) Filed: Jul. 17, 2020

(65) Prior Publication Data
US 2022/0021149 A1    Jan. 20, 2022

(51) Int. Cl.
*H01R 13/447* (2006.01)
*B60R 16/02* (2006.01)

(52) U.S. Cl.
CPC .......... *H01R 13/447* (2013.01); *B60R 16/02* (2013.01)

(58) Field of Classification Search
CPC .............. H01R 13/447; H01R 11/284; H01R 2201/26; B60R 16/02
See application file for complete search history.

(56) References Cited

U.S. PATENT DOCUMENTS

| 4,765,672 A * | 8/1988 | Weaver | B29C 45/14434 |
| | | | 296/192 |
| 5,344,330 A * | 9/1994 | Hoffman | B60L 53/31 |
| | | | 439/138 |
| 6,646,416 B2 * | 11/2003 | Streuer | H01R 11/289 |
| | | | 320/107 |
| 7,364,457 B2 * | 4/2008 | Mehki | H01R 11/282 |
| | | | 439/34 |
| 10,236,121 B2 * | 3/2019 | Hattori | H01G 4/18 |
| 2013/0330583 A1 | 12/2013 | Lacroix | |

(Continued)

FOREIGN PATENT DOCUMENTS

| CN | 204067481 U | 12/2014 | |
| CN | 106469869 A * | 3/2017 | ....... H01R 13/62933 |
| CN | 108528261 A * | 9/2018 | |

(Continued)

OTHER PUBLICATIONS

Fenton, Jared, "Charging And Jump Starting Your A6," Pelican Technical Article, www.pelicanparts.com, 3 pages.

*Primary Examiner* — Tho D Ta
(74) *Attorney, Agent, or Firm* — Vichit Chea; Carlson, Gaskey & Olds, P.C.

(57) ABSTRACT

The present disclosure relates to an apparatus that includes a vehicle battery terminal having a first terminal and a second terminal. The apparatus also includes a bracket having a first region aligned with the first terminal and a second terminal region aligned with the second terminal. The first and second regions space apart the first terminal and the second terminal. The apparatus also includes a post and a shield. The post extends from the bracket to partially surround the first terminal. The shield has a cover plate and a frame extending outwardly from the cover plate. The frame is provided to protect the first terminal and the second terminal.

20 Claims, 8 Drawing Sheets

(56) References Cited

U.S. PATENT DOCUMENTS

2020/0101852 A1* 4/2020 Hatami .................. B60L 53/16

FOREIGN PATENT DOCUMENTS

| DE | 102018201439 A1 * | 8/2019 | ............. H01R 4/302 |
| DE | 202019104921 U1 * | 9/2019 | ............. B60R 16/02 |
| DE | 102018210892 A1 * | 1/2020 | ......... H01R 13/5219 |
| EP | 1266800 A2 | 12/2002 | |

* cited by examiner

EXTERIOR JUMP-START BATTERY TERMINAL APPARATUS

BACKGROUND

Technical Field

The present disclosure is generally related to a jump-start system of a vehicle having a battery terminal apparatus that is externally accessible to jump-start a battery of the vehicle.

Description of the Related Art

Vehicles typically have a battery that provides power for various features, including to provide power to an electric motor of an electric vehicle. Under some circumstances, the battery of the vehicle may be charged or powered by jump-starting, which typically involves using a pair of jumper cables connected to an external power source, such as a special battery pack designed for jump-starting the battery.

In many vehicles, the battery is positioned inside the vehicle under a hood or in a trunk. In certain vehicles, the battery is installed inside a passenger compartment or specifically under a seat of the vehicle.

BRIEF SUMMARY

The present disclosure is directed to a system that enables convenient, secure, and external access to a first and second terminal for jump-starting a vehicle in response to a drained battery. The system includes a variety of arrangements of the first and second terminals to provide a compact system for manual access of the first and second terminals without opening a hood or trunk, such as in a windshield leaf screen area of the vehicle.

In one embodiment of the present disclosure, a vehicle includes a windshield, a leaf screen positioned adjacent to the windshield. The vehicle also includes a chamber including first and second terminals disposed within the chamber. A shield is coupled to the leaf screen and aligned with the chamber, with the shield being moveable between an open position and a closed position.

In one embodiment of the present disclosure, an apparatus includes a first terminal and a second terminal, and a bracket having a first region aligned with the first terminal and a second region aligned with the second terminal. The first and second regions are spaced apart from the first terminal and the second terminal. A post extends from the bracket to partially surround the first terminal.

In one embodiment of the present disclosure, a system includes a vehicle that has a windshield, a leaf screen positioned adjacent to the windshield, and a chamber having first and second terminals. The system also includes a battery coupled to the chamber through the first and second terminals. A shield is coupled to the leaf screen. The shield is moveable between an open position to expose the first and the second terminals and a closed position to cover the chamber. The system also includes a protective post that partially surrounds at least one of the first terminal or the second terminal.

BRIEF DESCRIPTION OF THE SEVERAL VIEWS OF THE DRAWINGS

For a better understanding of the embodiments, reference will now be made by way of example to the accompanying drawings. In the drawings, identical reference numbers identify similar elements or acts. The sizes and relative positions of elements in the drawings are not necessarily drawn to scale. For example, some of these elements may be enlarged and positioned to improve drawing legibility.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures or methods associated with vehicles have not been shown or described in detail to avoid unnecessarily obscuring descriptions of the embodiments.

Figure 1A:
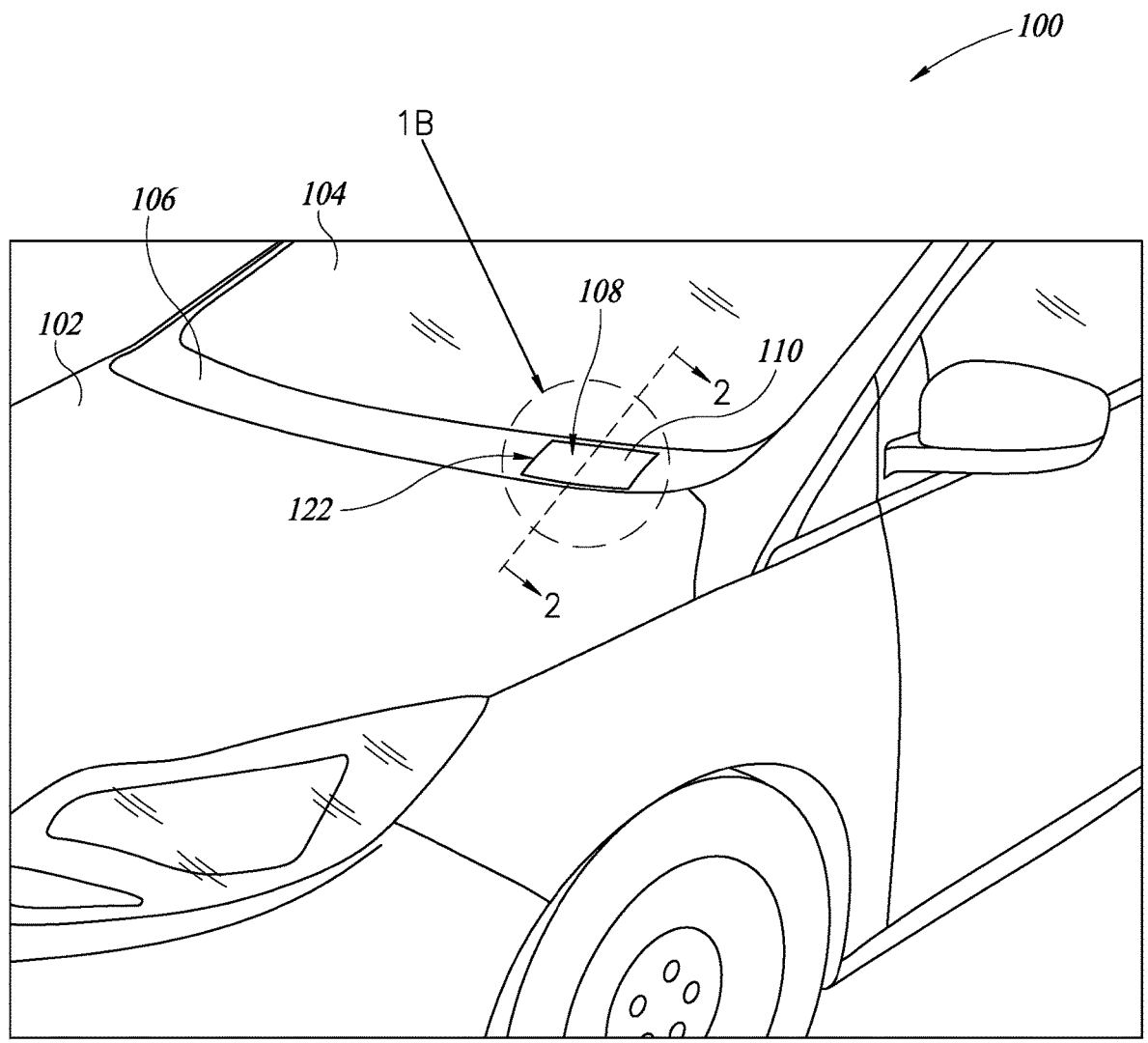
FIG. 1A is a partial isometric view of a vehicle having a battery terminal apparatus, according to an embodiment of the present disclosure.
Figure 1B:
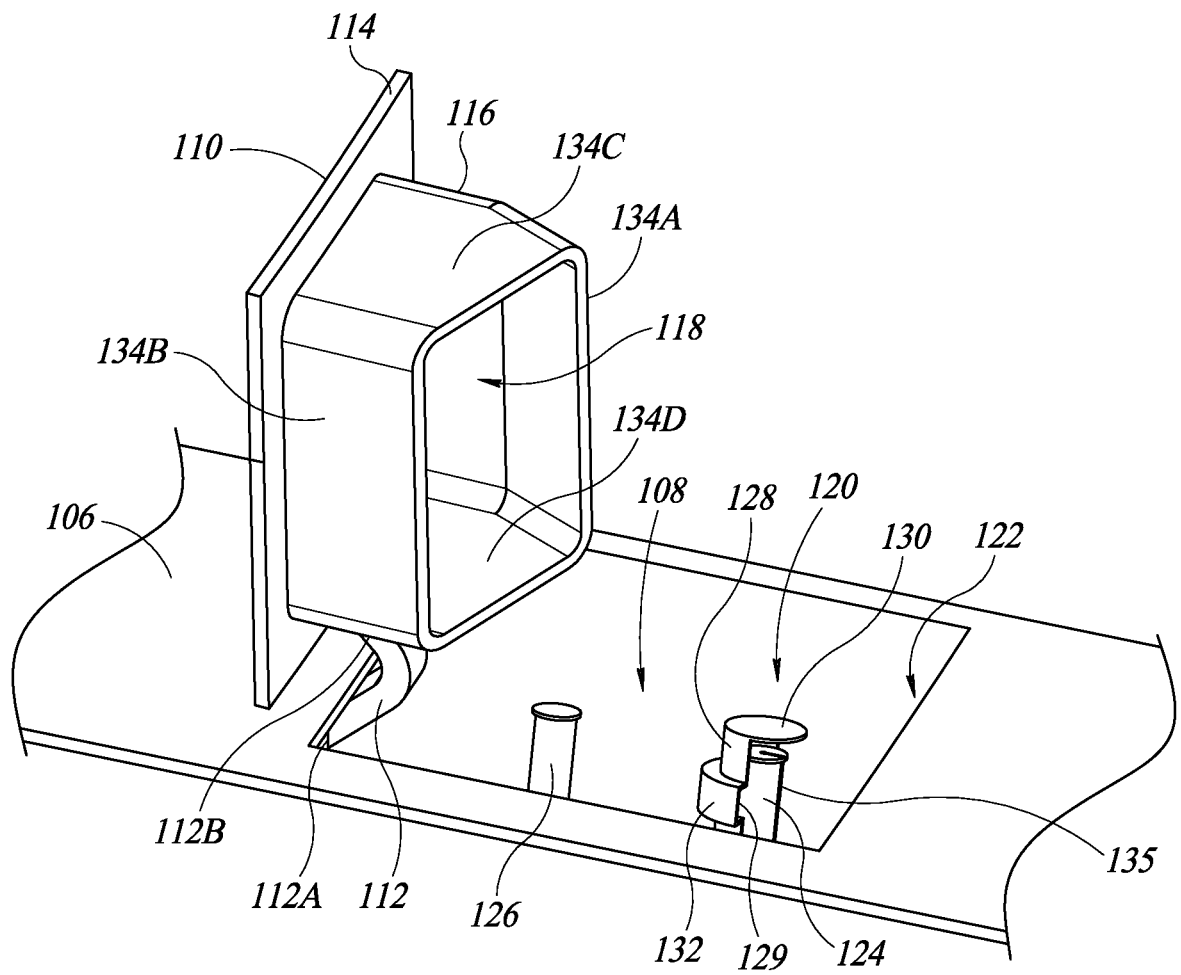
FIG. 1B is a detailed view of the battery terminal apparatus of FIG. 1A, illustrating a shield of the battery terminal apparatus in an open position, according to an embodiment of the present disclosure.
Figure 2:
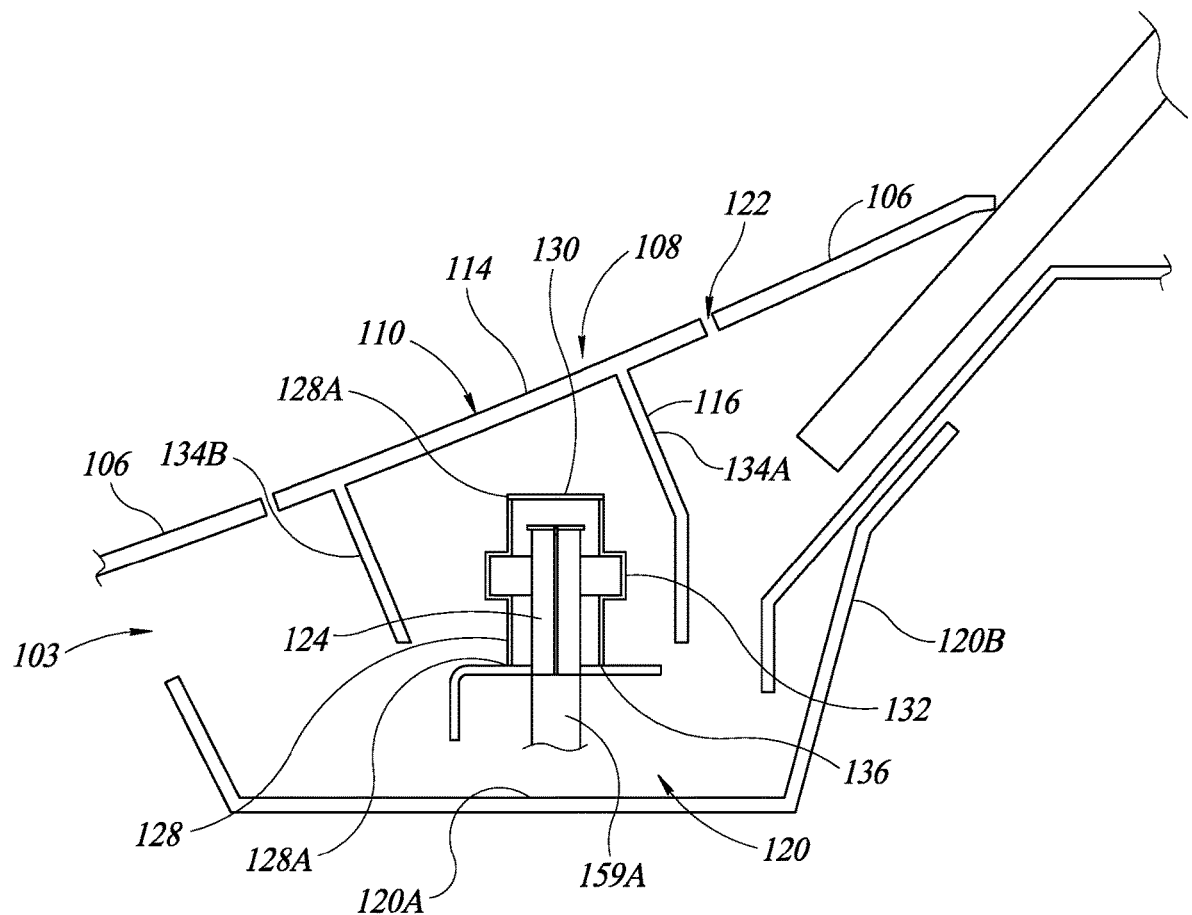
FIG. 2 is a cross-sectional view of the vehicle of FIG. 1A, taken along line 2-2 of FIG. 1A, according to an embodiment of the present disclosure.

FIGS. 1A-2 illustrate a vehicle 100, according to one example, non-limiting embodiment. Referring now to FIG. 1A, which is a partial isometric view of the vehicle 100 that includes a hood 102, a windshield 104, and a leaf screen 106 positioned at a front end of the vehicle 100 and between the hood 102 and the windshield 104. The hood 102 is generally provided to cover a compartment, for example, compartment 103, which is partially illustrated in FIG. 2. The compartment 103 generally includes various components of the vehicle 100, including but not limited to, an engine, a drive motor, a transmission, etc. The hood 102 further ensures security of the components housed in the compartment 103. In the illustrated embodiment, the compartment 103 is positioned at a front end of the vehicle 100. It should be noted that in some embodiments, however, the compartment 103 that houses various components of the vehicle, such as those described above, may be positioned at a rear end of the vehicle 100.

In one embodiment, the leaf screen 106 is positioned adjacent to the windshield 104 and the hood 102, as illustrated in FIG. 1A. The leaf screen 106 facilitates drainage of water or debris falling on or from the windshield 104.

The vehicle 100 includes a battery terminal apparatus 108, which is positioned at the front end of the vehicle 100 underneath the leaf screen 106. The battery terminal apparatus 108 is positioned to enable a user to have external access to the battery terminal apparatus 108, without unlocking the vehicle 100 or the hood 102. In some embodiments, the battery terminal apparatus 108 may be positioned elsewhere on the vehicle 100, such that the battery terminal apparatus 108 is externally accessible. For example, certain vehicle manufacturers may prefer to install the battery terminal apparatus 108 on the vehicle's side body or at the vehicle's rear end for various aesthetic or practical purposes, or due to placement of the engine or drive motor at the rear end.

In some embodiments, the leaf screen 106 includes a recess 122. The recess 122 is sized, shaped, and arranged to receive the battery terminal apparatus 108. In other embodiments, the recess 122 may be provided at any other location of the vehicle 100, for example, on the hood 102 or on a bumper of the vehicle 100. A position of the recess 122 may be selected to enable a user to externally access the battery terminal apparatus 108 for jump-starting the vehicle 100. Therefore, in case of a complete battery drain or power loss situation, the user may not need to electrically unlock the vehicle 100 or open the hood 102 for jump-starting the vehicle 100. A complete battery drain or power loss occurs when a charge level of the battery terminal apparatus is less than a threshold charge level.

Further, as illustrated in FIG. 1A, the battery terminal apparatus 108 includes a shield 110 (may also be referred to as a lid or a cover) coupled to the leaf screen 106. In some embodiments, the shield 110 may include a cover plate 114. In one embodiment, the recess 122 is sized and shaped to receive the cover plate 114. The shield 110 may be operable to provide protection against external conditions, such as, for example, rain, debris, etc., or impact damage incurred during accidents. More details on the configuration of the leaf screen 106, the battery terminal apparatus 108, and the shield 110 are illustrated in FIGS. 1B and 2 of the present disclosure.

Referring now to FIG. 1B, a detailed view of the battery terminal apparatus 108 of FIG. 1A is provided. As illustrated, the shield 110 is coupled to the leaf screen 106 via a hinge 112. In particular, the shield 110 includes the cover plate 114 and a frame 116. In one embodiment, the hinge 112, the frame 116, and the cover plate 114 are detachably coupled with each other. In another embodiment, the frame 116 is integrally formed with the cover plate 114 to form the shield 110.

The hinge 112 has a first end 112A and a second end 112B. The first end 112A is coupled to the leaf screen 106 and the second end 112B is coupled to the shield 110. In one embodiment, the second end 112B may be coupled to the frame 116. In an alternative embodiment, the second end 112B may be coupled to the cover plate 114.

The hinge 112 is operable to facilitate movement of the shield 110 between an open position and a closed position. FIG. 1B provides an exemplary view of the shield 110 in the open position and FIG. 1A provides an exemplary view of the shield 110 in the closed position.

As illustrated in FIG. 1B, the frame 116 of the shield 110 extends outwardly from the cover plate 114. In one embodiment, the frame 116 is sized, shaped, and arranged to enclose a substantial portion of various components of the battery terminal apparatus 108 as described herein, when the shield 110 is in the closed position. The shield 110 is operable such that the frame 116 and the cover plate 114 do not contact any component of the battery terminal apparatus 108, while moving between the open and the closed positions. The shield 110 may comprise various materials that can allow the shield 110 to withstand various heat and pressure conditions. Such materials may include rust resistant materials, carbon fibers, various plastic materials, metals, alloys, etc.

The frame 116 includes a plurality of plates, as illustrated in FIG. 1B. The plurality of plates includes a front plate 134A, a rear plate 134B, a first side plate 134C, and a second side plate 134D (plurality of plates collectively identified with reference numeral 134). The plurality of plates 134 are sized, shaped, and arranged to form a receptacle region 118 for securing or enclosing various components of the battery terminal apparatus 108, when the shield 110 is in the closed position.

In one embodiment as illustrated in FIG. 1B, the front plate 134A is designed to cover components of the battery terminal apparatus 108. The front plate 134A shields components of the battery terminal apparatus 108 from external conditions such as rain, dust, insects, debris, etc. Further, the front plate 134A is curved or bent toward the rear plate 134B to enclose components of the battery terminal apparatus 108.

In one embodiment, the front plate 134A and the rear plate 134B may have the same dimensions. Similarly, the first side plate 134C and the second side plate 134D may have the same dimensions. Alternatively, the dimensions of the plurality of plates 134 of the shield 110 may be different. Generally, dimensions of the plurality of plates 134 of the shield 110 may be designed to provide protection to components of the battery terminal apparatus 108 from external environmental conditions and accidental damage. For example, in the event of a structural impact, the cover plate 114 and the plurality of plates 134 of the frame 116 may prevent battery terminals from contacting each other. As described above, in one embodiment, the shield 110 may be designed to enclose components of the battery terminal apparatus 108 when in the closed position. Also, the cover plate 114 of the shield 110 may be designed to restrict external access to the battery terminal apparatus 108 in the closed position.

However, in the open position, the shield 110 may allow convenient access to components of the battery terminal apparatus 108. Thereby, the user of the vehicle 100 may prefer to keep the shield 110 in the closed position to protect the battery terminal apparatus 108. However, when needed, the user may move the shield 110 to the open position to access components of the battery terminal apparatus 108.

In some embodiments, the shield 110 may include a mechanism to facilitate movement between the open position and the closed position. The mechanism may be automated or manual. For example, a slot, a handle, a lever, a push button, or similar mechanism may enable the user to manually open or close the shield 110. Further, the shield 110 may be operable to move in any direction to attain the open position from the closed position. In one embodiment, the shield 110 may have a sliding mechanism to move between the open position and the closed position. In this manner, in lieu of a hinged movement of the shield 110, the shield may facilitate slideable coupling of the battery apparatus 108 to the leaf screen 106, or other components of the vehicle 100.

In some embodiments, a sensor-based mechanism may be used to facilitate automatic open or close functionality of the shield 110. Sensor(s) may be configured to sense a triggering event for signaling locking or unlocking of the shield 110. In one embodiment, the shield 110 may also be equipped with a security or lock mechanism to ensure that only authorized users may open the shield 110 to access the battery terminal apparatus 108. In one embodiment, the sensor-based mechanism may be operable by a power source that is separate from a battery of the vehicle 100.

As further illustrated in FIG. 1B, the battery terminal apparatus 108 is housed underneath the leaf screen 106 inside a chamber 120 that is at least in part defined by the recess 122. In an embodiment, the chamber 120 includes an opening created by the recess 122 on the leaf screen 106. The opening on the leaf screen 106 enables a user to access a space underneath the leaf screen 106, wherein components of the battery terminal apparatus 108 are housed. In one embodiment, a perimeter of the recess 122 may define a perimeter of the chamber 120. The recess 122 may thereby enable a user to externally access components of the battery terminal apparatus 108 housed underneath the leaf screen 106 (e.g., within the chamber 120) without unlocking the vehicle 100 and/or the hood 102.

In one embodiment, the chamber 120 is an area of the vehicle 100 where the battery terminal apparatus 108 is positioned. The chamber 120 provides a compact space to position the battery terminal apparatus 108 and provide access to a user via the recess 122 in the leaf screen 106. In another embodiment, the chamber 120 may alternatively be a closed space and comprised of metal sheets designed to securely house the battery terminal apparatus 108 within the vehicle 100. In another embodiment, the chamber 120 may be provided in or on a chassis or cowl of the vehicle 100.

The chamber 120 may be positioned in any section or region of the vehicle 100, provided that the chamber 120 provides a user external access to the battery terminal apparatus 108 when the shield 110 is in the open position. However, when the shield 110 is in the closed position, the chamber 120 may facilitate the frame 116 of the shield 110 surrounding or enclosing components of the battery terminal apparatus 108.

Moreover, the chamber 120 may be of any shape, size, or dimension suitable to accommodate the battery terminal apparatus 108 and its components. Vehicle manufacturers may prefer to keep the shape, size, and dimension of the chamber 120 as small as possible. Minimum size of the chamber 120 may be desirable for ensuring aesthetics, utility, cost effectiveness, and security from external conditions.

In one embodiment, when the shield 110 moves from the open position to the closed position, the shield 110 aligns with the position of the chamber 120 and components of the battery terminal apparatus 108. Further, when the shield 110 is in the closed position, peripheral edges of the cover plate 114 of the shield 110 extend toward a perimeter of the recess 122 to cover the chamber 120. Moreover, in some embodiments, the cover plate 114 of the shield 110 provides continuity with the leaf screen 106, when the shield 110 is in the closed position, to provide a seamless external appearance.

In one embodiment, the cover plate 114 and the recess 122 may both have a rectangular shape. In other embodiments, however, the cover plate 114 and the recess 122 may have other shapes, sizes, or dimensions to protect the battery terminal apparatus 108.

Referring now to FIG. 2, which is a cross-sectional view of the vehicle 100 of FIG. 1A, taken along line 2-2 of FIG. 1A, with continued reference to FIGS. 1A and 1B, and certain components, e.g., nut, coupling member, washer, etc., removed for clarity of illustration and description. As illustrated in FIG. 2, components of the battery terminal apparatus 108 are housed inside the chamber 120 underneath the leaf screen 106. The chamber 120 includes a base plate 120A and one or more side plates 120B. In one embodiment, the one or more side plates 120B are inclined at an obtuse angle with respect to the base plate 120A, which may increase a volume of space available for positioning the battery terminal apparatus 108. In one embodiment, the chamber 120 may include a mounting structure (not shown for the sake of clarity of description and illustration) on which the battery terminal apparatus 108 may be mounted.

In one embodiment, the base plate 120A or the one or more side plates 120B may be mounted or coupled to a cowl or chassis of the vehicle 100. Alternatively, the base plate 120A or the one or more side plates 120B may be coupled to the leaf screen 106 or the hood 102 of the vehicle 100.

The battery terminal apparatus 108 includes a bracket 136 that is sized, shaped, and arranged to provide a platform to mount a first terminal 124, a second terminal 126, and a post 128 of the battery terminal apparatus 108. The bracket 136 is mounted within the chamber 120 and may be coupled to one or more components of the vehicle 100.

In one embodiment as illustrated in FIGS. 1A and 2, the shield 110 is in the closed position and the cover plate 114 is approximately flush with the leaf screen 106. Further, when the shield 110 is in the closed position, the frame 116 of the shield 110 penetrates substantially inside the chamber 120 to enclose a substantial portion of the battery terminal apparatus 108. Thereby, the shield 110, in the closed position, prevents the components of the battery terminal apparatus 108 from accidental damage and from external elements, such as dust, water, spillage, insects, debris, etc.

In one alternative embodiment, the shield 110 may be coupled to the leaf screen 106 via a sliding mechanism. The sliding mechanism may be operable to move the shield 110 (over or under the leaf screen 106) between a closed position and an open position. To move to the open position, the shield 110 may slide to one side and expose the chamber 120 for external access. Similarly, to move to the closed position, the shield 110 may slide back and cover components of the battery terminal apparatus 108. In one embodiment, the sliding mechanism may include a pair of guide rails to facilitate slideable movement of the shield 110. In one embodiment, the leaf screen 106 may include a slot to accommodate the shield 110, when the shield 110 is in the open position.

For example, the shield 110 may slidably move away from the recess 122 of the leaf screen 106 to expose the components of the battery terminal apparatus 108. Further, the shield 110 may slidably move toward the recess 122 to cover the chamber 120. In one embodiment, the shield 110 may operate as a cover or a lid for components of the battery terminal apparatus 108 or the leaf screen 106.

As described above, the components of the battery terminal apparatus 108 include the first terminal 124, the second terminal 126, and the post 128. In one embodiment, the first terminal 124 and the second terminal 126 may be coupled to a battery of the vehicle 100 as described in more detail with reference to FIG. 6. Specifically, the first terminal 124 may be coupled to a positive terminal or lead of the battery of the vehicle 100 and the second terminal 126 may be coupled to a negative terminal or lead of the battery of the vehicle 100.

As illustrated, the post 128 is positioned around the first terminal 124, and provides a protective cover for the first terminal 124. In one embodiment, the post 128 is an insulator and covers at least a portion of the first terminal 124. The covered portion of the first terminal 124 may be on a side that is proximate to, or facing, the second terminal 126.

For example, the post 128 may partially enclose or surround a portion 129 of the first terminal 124 that faces the second terminal 126 and expose a portion 135 of the first terminal 124 that faces away from the second terminal 126. In this manner, in the event of inadvertent movement of a clamp of the jumper cable, the post 128 can prevent the clamp from contacting another clamp of the jumper clamp to prevent, mitigate, or avoid short circuiting the battery terminal apparatus 108.

In some embodiments, in addition or as an alternative, the post 128 may be placed around the second terminal 126 to partially cover a portion of the second terminal 126 and expose another portion of the second terminal 126. Again, the post 128 around the second terminal 126 may face the first terminal 124 or the post 128 around the first terminal 124. The post 128 may, therefore, facilitate easy access to the first and second terminals 124, 126 and prevent accidental or inadvertent contact of the jumper cable clamps.

Figure 3:
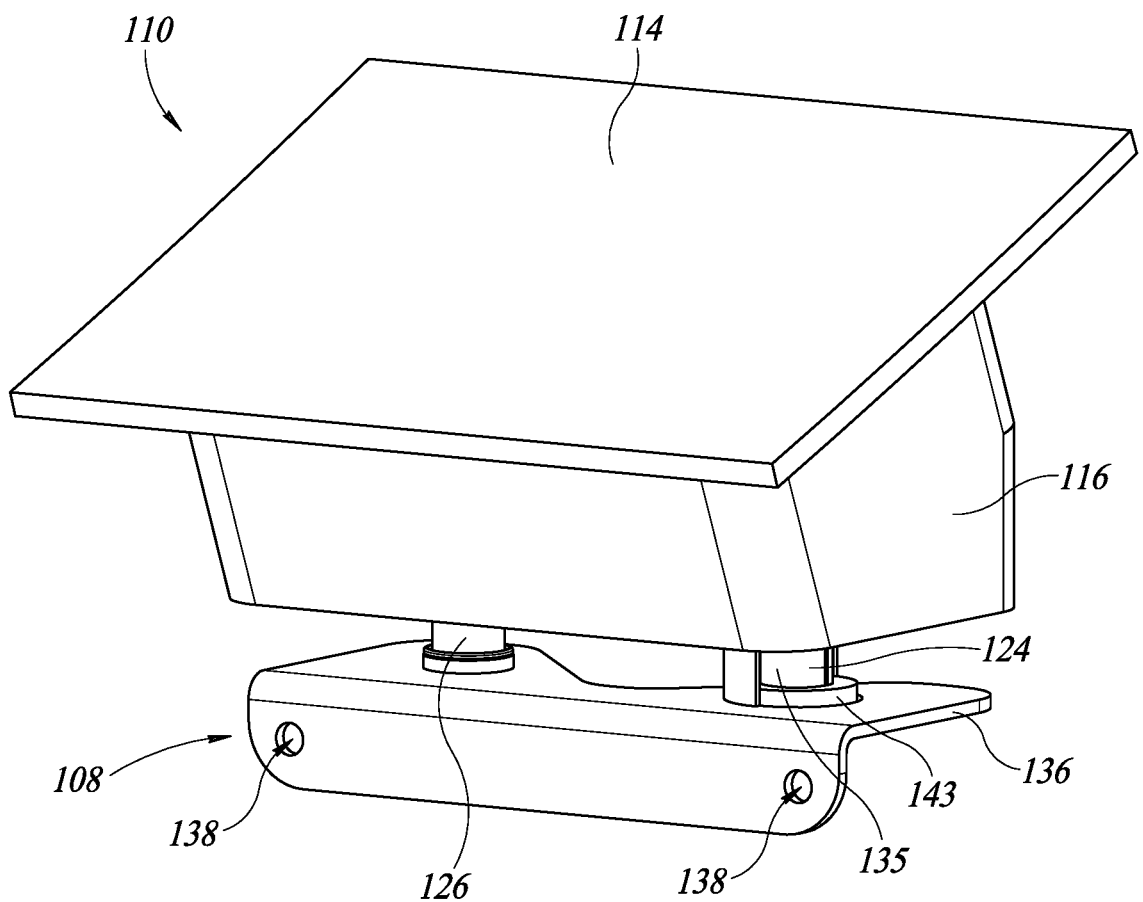
FIG. 3 is a partially exploded isometric view of the battery terminal apparatus of FIG. 1A, according to an embodiment of the present disclosure.
Figure 4:
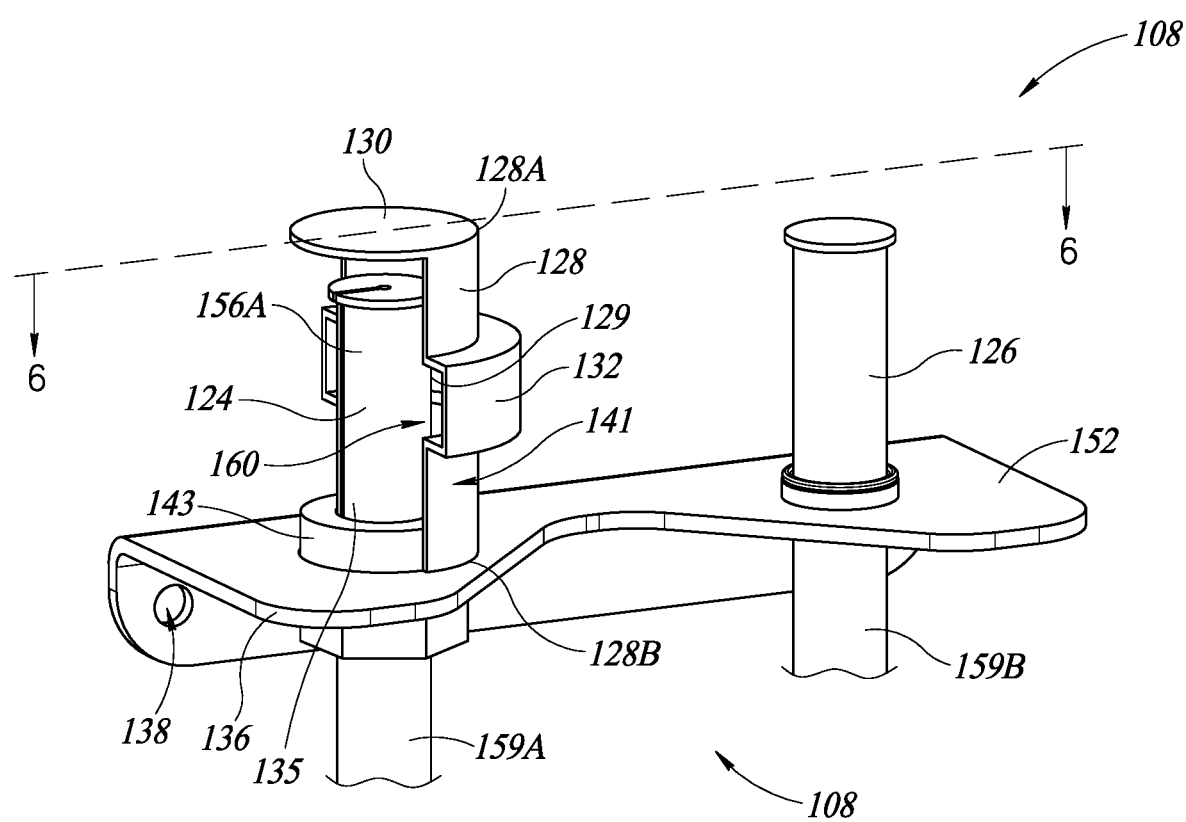
FIG. 4 is an isometric view of the battery terminal apparatus of FIG. 1A, with the shield removed for clarity of description and illustration, according to an embodiment of the present disclosure.
Figure 5:
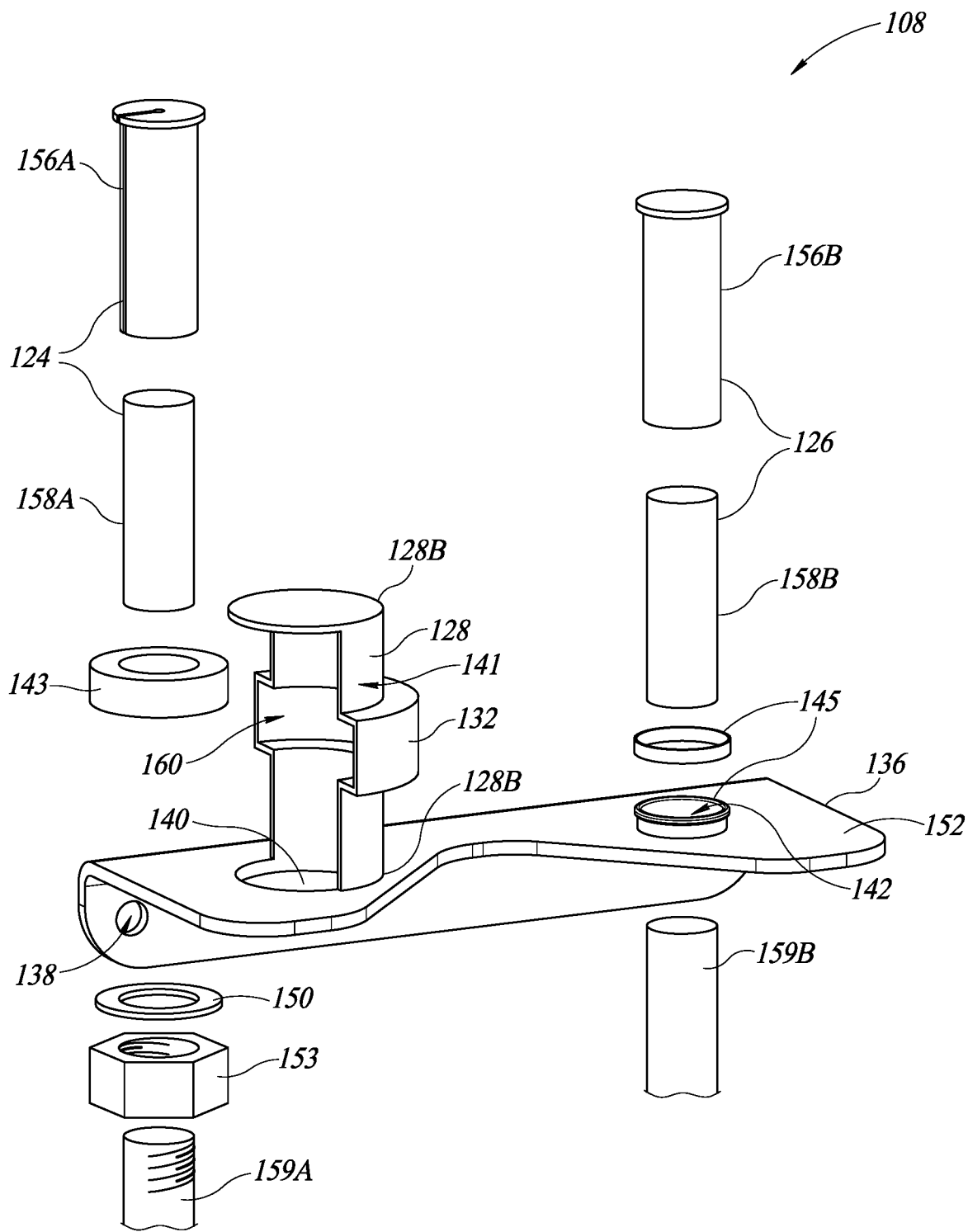
FIG. 5 is an exploded view of the battery terminal apparatus of FIG. 1A, with the shield removed for clarity of description and illustration, according to an embodiment of the present disclosure.
Figure 6:
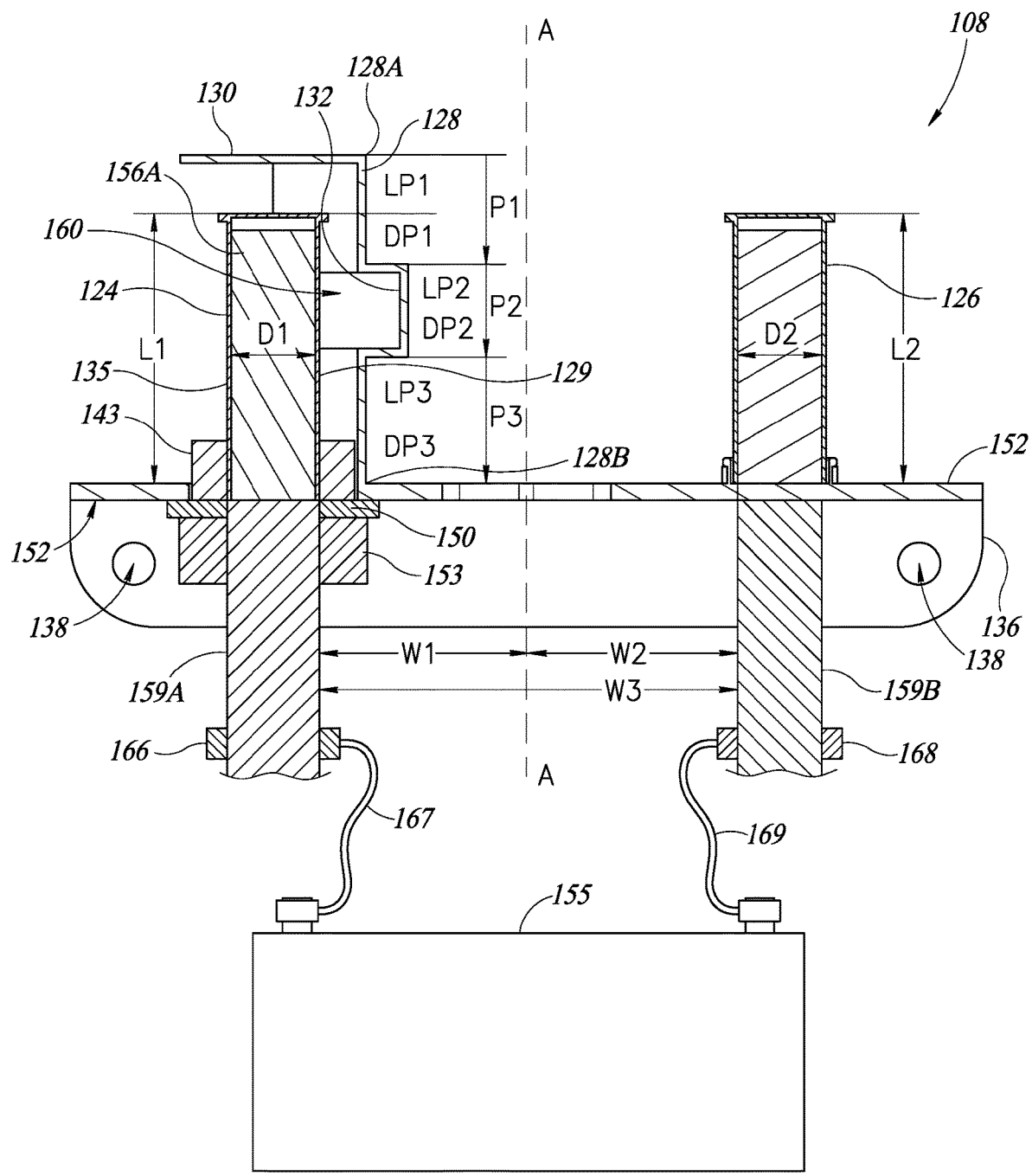
FIG. 6 is a cross-sectional view of the battery terminal apparatus of FIG. 1A, with the shield removed for clarity of description and illustration, taken along line 6-6 of FIG. 4, according to an embodiment of the present disclosure.

FIGS. 3-6 illustrate various views of the battery terminal apparatus 108, according to one or more embodiments of the present disclosure. In particular, FIG. 3 is a partially exploded isometric view of the battery terminal apparatus 108 of FIG. 1A. FIG. 4 is an isometric view of the battery terminal apparatus 108 of FIG. 1A, with the shield 110 removed for clarity of description and illustration. FIG. 5 is an exploded view of the battery terminal apparatus 108 of FIG. 1A, with the shield 110 removed for clarity of description and illustration. FIG. 6 is a cross-sectional view of the battery terminal apparatus 108 of FIG. 1A, with the shield 110 removed for clarity of description and illustration, taken along line 6-6 of FIG. 4. In addition, FIG. 6 illustrates coupling of the battery terminal apparatus 108 to a battery 155 of the vehicle 100.

With reference to FIGS. 3-6 and continued reference to FIGS. 1A-2, the post 128 has a substantially semi-cylindrical shape. The post 128 is sized, shaped, and arranged to enclose a portion of the first terminal 124 or the second terminal 126. The post 128 includes a cap portion 130 and an extension region 132. In one embodiment, the cap portion 130 is positioned on a top end of the post 128, and near or adjacent to the shield 110, as illustrated in FIG. 2, for example. The cap portion 130 generally provides protection to the first terminal 124 from exposure to water, dust, debris, damage, or unwanted electricity flow.

The extension region 132 forms an opening 160 that is sized, shaped, and arranged for securely coupling jumper cable clamps. The extension region 132 protrudes outwardly from an outer surface 141 of the post 128. In some embodiments, the opening 160 of the extension region 132 may be of a semi-cylindrical shape. However, other shapes and sizes that allow for jumper cable clamps to be securely coupled to the first or second terminals 124, 126 are within the scope of the disclosed subject matter. The extension region 132 is sized, shaped, and arranged to prevent unintentional dislodging and rotation of the jumper cable clamps. For example, as the jumper cable clamp is received in the opening 160 and coupled to the first or second terminals 124, 126, the surrounding extension region 132 prevents dislodging or rotation of the jumper cable clamps, thereby preventing contact of the jumper cable clamps to potentially cause shorting of the first terminal 124 and the second terminal 126. Further, the post 128, by providing protection from shorting of the jumper cable clamps, allows the first terminal 124 and the second terminal 126 to be positioned closer to each other within the chamber 120, thus reducing the space footprint of the vehicle 100. In some embodiments, for example, the first and second terminals 124, 126 can be spaced apart by a distance that is less than or equal to 150 millimeters.

As described above, the battery terminal apparatus 108 includes the bracket 136. The bracket 136 may comprise various materials that can allow the shield to withstand various heat and pressure conditions. Such materials may include rust resistant materials, carbon fibers, metals, alloys, etc. In some embodiments, the bracket 136 may comprise various non-conductive materials, e.g., rubber, plastic, etc.

In one embodiment, the bracket 136 of the battery terminal apparatus 108 includes apertures 138 to facilitate coupling or mounting of the bracket 136. For example, the bracket 136 may be mounted on any part of the vehicle 100, such as, for example, the chassis, cowl, hood 102, leaf screen 106, or other components of the vehicle 100 via fasteners received through the apertures 138. Such fasteners may include rivets, nuts and bolts, screws, etc.

In some embodiments, the bracket 136 may include markings or other indicia to indicate the position of the first terminal 124 and the second terminal 126. In one example embodiment, the markings may include a positive (+) sign to identify the positive terminal and a negative (−) sign to identify the negative terminal. Such markings may be helpful to the user of the vehicle 100 in identifying a live terminal. In one embodiment, such markings may additionally or alternatively be provided on the cover plate 114 of the shield 110.

The post 128 is coupled to the bracket 136 and extends outwardly from the bracket 136 to partially surround the first terminal 124. In one embodiment, the post 128 is removably attached to the bracket 136. In one embodiment, the post 128 is integrally formed with the bracket 136. The post 128 is generally sized and shaped to ensure that a clamp of the jumper cable connected to the first terminal 124 does not contact the second clamp of the jumper cable. Thus, the post 128 prevents short circuiting in the battery terminal apparatus 108.

In one embodiment, the post 128 may be placed additionally or alternatively around the second terminal 126. For example, in another embodiment, first terminal 124 and the second terminal 126 may both be covered by a post (such as the post 128). In such an embodiment, extension regions (e.g., extension region 132) may face each other to ensure that clamps of the jumper cable do not make contact with each other.

The distance between the first and second terminals 124, 126 may be further reduced, making design of the battery terminal apparatus 108 even more compact and economical.

The cap portion 130 of the post 128 comprises a circular shape that covers the first terminal 124, although other sizes and shapes are within the scope of the disclosed subject matter, such as, for example, oval, elliptical, conical, etc. The cap portion 130 is generally sized, shaped, and arranged to prevent the first terminal 124 from direct exposure to water, dust, or any other conducting component in the vehicle 100, which may trigger a short circuit.

In one embodiment, the post 128 includes a first end 128A and a second end 128B. The cap portion 130 is positioned proximate to the first end 128A. The extension region 132 is positioned between the first end 128A and the second end 128B of the post 128. In one embodiment, as described above, the extension region 132 has a semi-cylindrical shape. Again, the extension region 132 protrudes outwardly from an outer surface 141 of the post 128. In one embodiment, the extension region 132 may be positioned anywhere on the post 128 to facilitate easy access to the first terminal 124.

With continued reference to FIGS. 3-6, the bracket 136 includes a first region 140 and a second region 142. The post 128 is coupled to the bracket 136 in or near the first region 140. In some embodiments, the first region 140 and the second region 142 may take the form of apertures or openings through which the first and second terminals 124, 126 extend. In particular, the first terminal 124 includes a first cover 156A, a first electrode 158A, and a first coupling shaft 159A. Similarly, the second terminal 126 includes a second cover 156B, a second electrode 158B, and a second coupling shaft 159B. The first and second covers 156A, 156B are generally hollow and cylindrical in shape to cover or surround and protect the first and second electrodes 158A, 158B, respectively. In some embodiments, the covers 156A, 156B can be received in the corresponding first and second regions 140, 142, with the first coupling shaft 159A and the second coupling shaft 159A extending outwardly from the first and second regions 140, 142.

A first coupling element 143 is coupled to the bracket 136 and is positioned in the first region 140. The first coupling element 143 is sized and shaped to be coupleably received in the first region 140. In some embodiments, the first coupling element 143 can comprise an insulator to electrically isolate the bracket 136 from the first electrode 158A and the first cover 156A. The first coupling element 143 is positioned adjacent to the post 128 and surrounds the first cover 156A. In some embodiments, the first coupling shaft 159A includes threads to threadedly couple or otherwise receive a nut 153 and a first washer 150. The nut 153 holds or secures the first terminal 124 in place with respect to the bracket 136. For example, the first washer 150 can mate or abut with a lower surface 151 of a flange 152 of the bracket 136, with the nut 153 positioned adjacent to the first washer 150. In an embodiment, as shown in FIG. 6, the first washer 150 is an insulator to electrically isolate the bracket 136 from the first electrode 158A. As shown in FIG. 6, the first nut 153 can be screwed to the first coupling shaft 159A to couple the first terminal 124 to the bracket 136. In some embodiments, a second coupling element 145 can be provided, which secures the bracket 136 to the second terminal 126. Again, the second coupling element 145 can be positioned in or near the second region 142.

As illustrated in FIG. 6, the first terminal 124 and the second terminal 126 are coupled or otherwise electrically connected to a battery 155. In particular, the first terminal 124 may be coupled to a positive terminal of the battery 155 via a first coupling member 166 and a first cable 167. Similarly, the second terminal 126 may be coupled to a negative terminal of the battery 155 via a second coupling member 168 and a second cable 169.

As illustrated in FIG. 6, the first terminal 124 is spaced apart from the second terminal 126 relative to axis A-A. For example, the first terminal 124 may be spaced apart from the axis A-A by distance W1. Similarly, the second terminal 126 may be spaced apart from the axis A-A by distance W2. As described above, the total distance of W1 and W2, e.g., W3, can in some embodiments be approximately 150 mm or less to reduce the space footprint while preventing unwanted shorting between the first and second terminals 124, 126. By providing post 128 around first terminal 124 or second terminal 126, W3 can be reduced to improve compactness form factors of vehicles.

The first terminal 124 has a length L1 measured along the reference axis A-A. The first terminal 124 also has a diameter D1 measured transverse to the reference axis A-A. Similarly, the second terminal 126 has a length L2 measured along the reference axis A-A and a diameter D2 measured transverse to the reference axis A-A. In one embodiment, the length L1 is equal to the length L2 and the diameter D1 is equal to the diameter D2. Alternatively, the lengths L1, L2 and the diameters D1, D2 may be selected to be different and variable.

The post 128 includes a first section P1, a second section P2, and a third section P3. The second section P2 aligns with the height of the extension region 132. The first section P1 extends from an end of the second section P2 to the first end 128A of the post 128 and the third section P3 extends from an end of the second section P2 to the second end 128B of the post 128. The first section P1 has a height of LP1 and diameter DP1, the second section P2 has a height of LP2 and diameter DP2, and the third section P3 has a height of LP3 and diameter DP3. In one embodiment, the diameters DP1, DP2 and DP3 of the post 128 are greater than a diameter D1 of the first terminal 124. In one embodiment, the diameter DP2 is greater than the diameter DP1 and DP3 of the post 128. The comparatively greater diameter DP2 of the extension region 132 provides extra space to conveniently and securely house jumper cable clamps. In one embodiment, diameter DP1 and DP3 of the post 128 may be equal or, in other embodiments, they may be unequal.

In one embodiment, the length LP1 is equal to length LP3 of the post 128, which may position the extension region 132 at approximately a center of the post 128. In another embodiment, the length LP1 may be less than the length LP3 of the post 128, which may position the extension region 132 proximate to the first end 128A. In one embodiment, the length LP2 (of the extension region 132) may be selected to coupleably receive clamps of the jumper cable to ensure that the clamps may be conveniently coupled to the first terminal 124. As illustrated in FIG. 6, the first and second terminals 124, 126 may be spaced apart relative to axis A-A at least in part based on the first region 140 and the second region 142 of the bracket 136.

Figure 7:
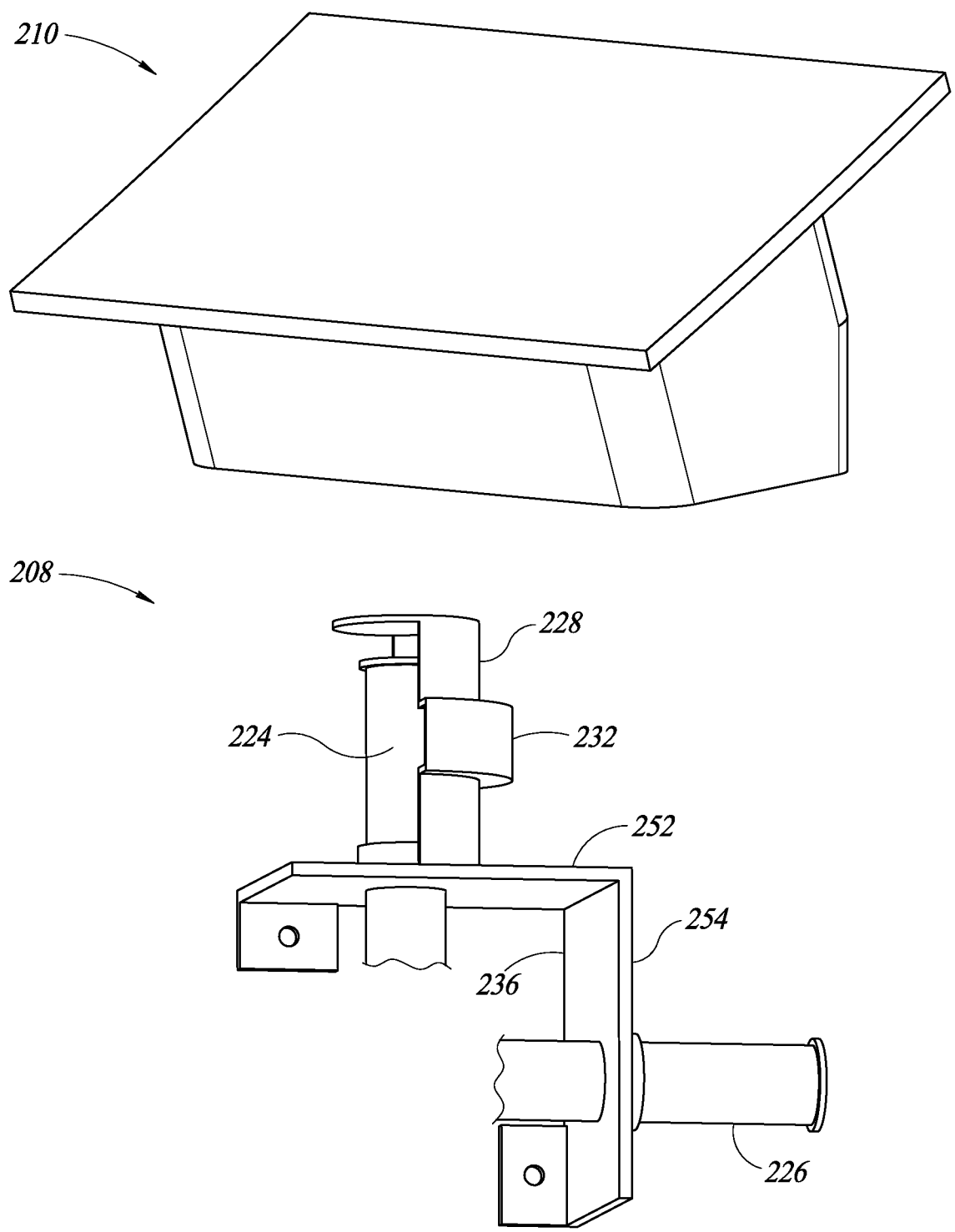
FIG. 7 is a partially exploded isometric view of a battery terminal apparatus, according to an embodiment of the present disclosure.

FIG. 7 illustrates a partially exploded isometric view of a battery terminal apparatus 208, according to another embodiment of the present disclosure. The battery terminal apparatus 208 is generally similar to the battery terminal apparatus 108, but provides certain variations. In particular, the battery terminal apparatus 208 includes a shield 210 that can be removably coupled to the vehicle 100, such that the shield 210 can have an open position and a closed position, as described above. The battery terminal apparatus 208 includes a bracket 236 which includes a first flange 252 and a second flange 254. The first flange 252 and the second flange 254 are angularly oriented with respect to each other. For example, the first flange 252 and the second flange 254 are oriented at a 90-degree angle with respect to each other. The angular orientation of the bracket 236 positions a first terminal 224 and a second terminal 226 away from each other. Thus, when jumper cable clamps are coupled to corresponding first and second terminals 224, 226, the angular orientation of the first terminal 224 and the second terminal 226 can prevent the clamps from contact.

In some embodiments, as illustrated in FIG. 7, the battery terminal apparatus 208 may optionally include a post 228 having an extension region 232. The post 228 is generally similar to the post 128, and is coupled to the first flange 252 around the first terminal 224. In one embodiment, the post 228 may additionally or alternatively be coupled to the second flange 254 around the second terminal 226.

In use, as the first and second terminals, e.g., first terminal 124 and second terminal 126, are connected to the battery, e.g., battery 155, the user may directly use the first and second terminals for jump-starting a vehicle. The vehicle user may use a jumper cable to connect one portion thereof, e.g., a set of clamps, to a power source and another portion thereof, e.g., another set of clamps, to the battery terminal apparatus, e.g., battery terminal apparatus 108, for jump-starting the vehicle, e.g., vehicle 100. For example, in the event of a battery of the vehicle 100 having a charge less than a certain threshold, a first positive clamp of a jumper cable may be coupled to the first terminal 124 and positioned within an opening, e.g., opening 160, provided in an extension region, e.g., extension region 132, of a post, e.g., post 128, with a first negative clamp remaining unconnected in the interim. A second positive clamp of the jumper cable may be coupled to a positive lead or terminal of a power source, such as a battery of a second vehicle, and a second negative clamp of the jumper cable may be coupled to a negative lead or terminal of the battery of the second vehicle. Thereafter, the first negative clamp of the jumper cable may be coupled to a ground or the second terminal 126. As described above, with the first positive clamp positioned within the post 128, any inadvertent rotation or contact with the first negative clamp can be avoided. The battery can thereafter be charged or powered by using the power of the battery of the second vehicle.

In the event that the battery of the vehicle 100 serves as the power source, the positive clamp of the jumper cable can be coupled to the first terminal 124 and positioned within the post 128. The negative clamp of the jumper cable can be coupled to the second terminal 126. The other set of clamps can be coupled to the battery with a charge less than a certain threshold as described above, and the power provided by the battery of the vehicle 100 can be used to charge or power the battery with the charge less than the certain threshold.

Moreover, the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A vehicle, comprising:
   a windshield;
   a leaf screen positioned adjacent to the windshield;
   a chamber including a first terminal and a second terminal disposed within the chamber and arranged to provide external access for jump-starting the vehicle; and
   a shield coupled to the leaf screen and aligned with the chamber, the shield being moveable between an open position and a closed position.

2. The vehicle of claim 1, further comprising:
   a hinge coupled to the shield, which hingedly moves the shield between the open position and the closed position, and further wherein the hinge has a first end and a second end, the first end coupled to the leaf screen and the second end coupled to the shield.

3. The vehicle of claim 1, further comprising:
   a post that is positioned around at least one of the first terminal or the second terminal.

4. The vehicle of claim 1 wherein the shield includes a frame extending outwardly from a cover plate, the frame including a receptacle region that encloses the first and second terminals when the shield is in the closed position.

5. The vehicle of claim 4 wherein the frame is integrally formed with the cover plate.

6. The vehicle of claim 1, further comprising:
   a post that partially surrounds a portion of at least one of the first terminal or the second terminal such that another portion of the first terminal or the second terminal is exposed.

7. The vehicle of claim 6 wherein the post includes a semi-cylindrical body having a first end and a second end.

8. The vehicle of claim 7 wherein the post includes a cap portion that protrudes from the first end.

9. The vehicle of claim 7 wherein the post further includes an extension region that is positioned between the first end and the second end of the post.

10. The vehicle of claim 9 wherein the extension region protrudes outwardly from an outer surface of the semi-cylindrical body.

11. An apparatus, comprising:
    a battery;
    a first terminal;
    a first cable electrically connecting the first terminal to the battery;
    a second terminal;
    a second cable electrically connecting the second terminal to the battery;
    a bracket having a first region aligned with the first terminal and a second region aligned with the second terminal, the first and second regions being spaced apart from the first terminal and the second terminal; and
    a post that extends from the bracket to partially surround the first terminal.

12. The apparatus of claim 11 wherein the post includes a semi-cylindrical body having an outer surface that faces the second terminal.

13. The apparatus of claim 11 wherein the post includes a first end and a second end, the post including a cap portion that protrudes from the first end.

14. The apparatus of claim 11 wherein the post includes a first end and a second end, the post including an extension region that is positioned between the first end and the second end.

15. The apparatus of claim 11, further comprising:
    a shield arranged to selectively cover the first and second terminals and having a cover plate and a frame extending outwardly from the cover plate.

16. The apparatus of claim 11 wherein the bracket includes a first flange and a second flange, the first flange angularly oriented relative to the second flange.

17. The apparatus of claim 11 wherein the post is removably attached to the bracket and comprises a semi-cylindrical body that partially surrounds a first portion of the first terminal such that a second portion of the first terminal is exposed.

18. A system, comprising:
    a vehicle including:
        a windshield;
        a leaf screen positioned adjacent to the windshield; and
        a chamber having a first terminal and a second terminals arranged to provide external access for jump-starting the vehicle;
    a battery coupled to the chamber through the first and second terminals;

a shield coupled to the leaf screen, the shield moveable between an open position to expose the first and the second terminals and a closed position to cover the chamber; and a post that partially surrounds at least one of the first terminal or the second terminal.

19. The system of claim 18 wherein the shield is hingedly coupled to the leaf screen to move between the open and closed positions.

20. The system of claim 18 wherein the post includes a first end and a second end, the post including an extension region that is positioned between the first end and the second end.

\* \* \* \* \*